United States Patent
Kudo et al.

(10) Patent No.: US 11,134,412 B2
(45) Date of Patent: Sep. 28, 2021

(54) WIRELESS COMMUNICATION DEVICE, WIRELESS COMMUNICATION METHOD AND NON-TRANSITORY COMPUTER READABLE MEDIUM

(71) Applicant: KABUSHIKI KAISHA TOSHIBA, Minato-ku (JP)

(72) Inventors: Hiroki Kudo, Kawasaki (JP); Suh Wuk Kim, Kawasaki (JP); Sakie Nagakubo, Kawasaki (JP); Ren Sakata, Yokohama (JP)

(73) Assignee: KABUSHIKI KAISHA TOSHIBA, Minato-ku (JP)

( * ) Notice: Subject to any disclaimer, the term of this patent is extended or adjusted under 35 U.S.C. 154(b) by 233 days.

(21) Appl. No.: 16/286,088

(22) Filed: Feb. 26, 2019

(65) Prior Publication Data

US 2020/0077297 A1     Mar. 5, 2020

(30) Foreign Application Priority Data

Sep. 3, 2018  (JP) .............................. JP2018-164825

(51) Int. Cl.
*H04W 28/04* (2009.01)
*H04W 72/12* (2009.01)
(Continued)

(52) U.S. Cl.
CPC ....... *H04W 28/04* (2013.01); *H04W 72/1263* (2013.01); *H04W 72/0446* (2013.01); *H04W 84/18* (2013.01)

(58) Field of Classification Search
CPC ........... H04L 1/1664; H04L 2001/0097; H04L 45/42; H04L 45/44; H04L 45/127;
(Continued)

(56) References Cited

U.S. PATENT DOCUMENTS

| 10,080,187 B2 | 9/2018 | Sakata et al. |
| 2015/0256401 A1* | 9/2015 | Zinger .................... H04L 41/14 370/401 |

(Continued)

FOREIGN PATENT DOCUMENTS

| JP | 2008-228178 A | 9/2008 |
| JP | 2010-233072 A | 10/2010 |

(Continued)

*Primary Examiner* — Oussama Roudani
(74) *Attorney, Agent, or Firm* — Oblon, McClelland, Maier & Neustadt, L.L.P.

(57) ABSTRACT

A wireless communication device includes a memory and a wireless interface and processing circuitry. The memory configured to store data to be transmitted and received. The wireless interface configured to transmit and receive a wireless signal. The processing circuitry coupled to the memory and configured to receive a message from another wireless device, including destination information and acknowledgement information, via the wireless interface, set, in a first period being a period in which the message from a child node which transmits the message upward while setting the child node itself as a destination is received, the acknowledgement information with respect to data received from the child node, process the message including the destination information and the acknowledgement information, and transmit a message including the set acknowledgement information via the wireless interface to another wireless device.

12 Claims, 10 Drawing Sheets

(51) Int. Cl.
*H04W 84/18* (2009.01)
*H04W 72/04* (2009.01)

(58) Field of Classification Search
CPC .... H04L 45/124; H04L 45/121; H04W 28/04;
H04W 84/18; H04W 72/1263; H04W
40/00; H04W 72/0446; H04W 40/16;
H04B 1/69; H04B 2001/6908
See application file for complete search history.

(56) References Cited

U.S. PATENT DOCUMENTS

| | | | |
|---|---|---|---|
| 2016/0029403 A1* | 1/2016 | Roy | H04W 28/0278 |
| | | | 370/336 |
| 2016/0227419 A1* | 8/2016 | Leroux | H04L 1/1671 |
| 2018/0124812 A1* | 5/2018 | Thubert | H04B 1/713 |
| 2018/0278353 A1 | 9/2018 | Tohzaka et al. | |
| 2019/0363976 A1* | 11/2019 | Thubert | H04L 45/02 |

FOREIGN PATENT DOCUMENTS

| | | |
|---|---|---|
| JP | 2013-232758 A | 11/2013 |
| JP | 5516070 | 6/2014 |
| JP | 2016-054349 | 4/2016 |
| JP | 2018-50186 A | 3/2018 |
| JP | 2018-160744 | 10/2018 |

\* cited by examiner

WIRELESS COMMUNICATION DEVICE, WIRELESS COMMUNICATION METHOD AND NON-TRANSITORY COMPUTER READABLE MEDIUM

CROSS REFERENCE TO RELATED APPLICATIONS

This application is based upon and claims the benefit of priority from the prior Japanese Patent Application No. 2018-164825, filed on Sep. 3, 2018, the entire contents of which are incorporated herein by reference.

FIELD

The embodiments of the present invention relate to a wireless communication device, a wireless communication method and a non-transitory computer readable medium.

BACKGROUND

In wireless communication, in a multi-hop network, in order to transmit data to a plurality of parent nodes at a time, a communication method of broadcast and multicast bases is being used. When this communication method is employed, it is difficult to transmit an acknowledgement (ACK) which notifies an arrival of a signal, so that a method of notifying the arrival of the signal by adding a field for ACK to a normal communication frame has been known.

In this method, the ACK is transmitted from one communication leader to a plurality of communication members in a single packet. From the leader, an ACK bit in a previous cycle is included to be transmitted, and from the members, an ACK bit in a current cycle is included to be transmitted, thereby avoiding error determination of an ACK bit. However, both the leader and the members are required to be in a state where they can communicate with one another in all cycles, which causes an increase in power consumption. Moreover, when an allocation method of communication slots is different, consistency of an ACK bit is not established, and there is a possibility that error determination occurs.

DETAILED DESCRIPTION

Figure 1:
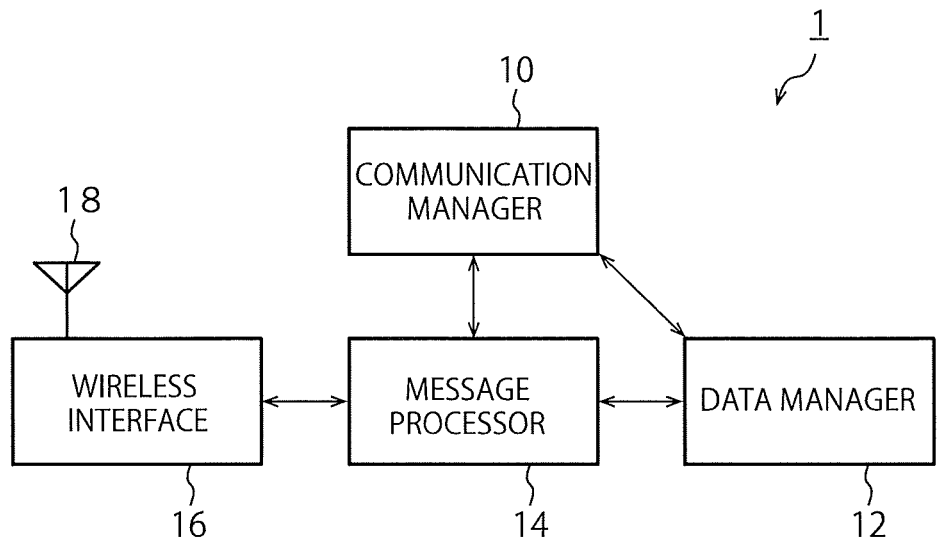
FIG. 1 is a block diagram illustrating a function of a wireless communication device according to one embodiment.

According to one embodiment, a wireless communication device includes a memory and a wireless interface and processing circuitry. The memory configured to store data to be transmitted and received. The wireless interface configured to transmit and receive a wireless signal. The processing circuitry coupled to the memory and configured to receive a message from another wireless device, including destination information and acknowledgement information, via the wireless interface, set, in a first period being a period in which the message from a child node which transmits the message upward while setting the child node itself as a destination is received, the acknowledgement information with respect to data received from the child node, process the message including the destination information and the acknowledgement information, and transmit a message including the set acknowledgement information via the wireless interface to another wireless device.

Embodiments will now be explained with reference to the accompanying drawings. The present invention is not limited to the embodiments. In the drawings to be referred to, the same codes or similar codes are given the same portions or portions having similar functions and duplicated explanation thereof may be omitted. Further, the dimensional ratios in the drawings may be different from the actual ratios for convenience of explanation and a part of the configuration may be omitted from the drawing.

First Embodiment

FIG. 1 is a block diagram illustrating a function of a wireless communication device 1 according to a first embodiment. The wireless communication device 1 includes a communication manager 10, a data manager 12, a message processor 14, and a wireless interface 16.

The communication manager 10 manages information regarding an ACK indicating acknowledgement information in a received message and a message to be transmitted, information of information management bits, and the like. The ACK is linked to information based on a unique identifier uniquely imparted to the wireless communication device 1, to be managed, for example. A set of bits indicating ACKs of the wireless communication device 1 itself and another wireless communication device 1 is described as an ACK bit sequence. That is, the communication manager 10 judges whether or not data transmitted by the wireless communication device 1 itself has been received normally in the other wireless communication device 1 by referring to an ACK bit sequence received from the other wireless communication device 1. Conversely, when the wireless communication device 1 itself has normally received data transmitted from the other wireless communication device 1, the communication manager 10 sets the ACK to perform notification to the message processor 14.

The data manager 12 stores and manages data to be transmitted in a communication cycle. Further, the data manager 12 may store a program for the communication manager 10 or the like to control the wireless communication device 1. Moreover, it may be used as a buffer which temporarily stores data to be transmitted or received data.

The message processor 14 performs processing of transmission/reception messages. The message processor 14 interprets a message received from the wireless interface 16, and divides the message into upward and downward messages, for example. Further, the message processor 14 generates a communication message based on an instruction from the communication manager 10, and transmits it to the wireless interface 16. In particular, the message processor 14 writes the ACK of the wireless communication device 1 itself notified from the communication manager 10 and set with respect to the other wireless communication device 1, in a corresponding place in a bit sequence. A message in which this ACK has been written is transmitted, thereby making it possible to notify information of from which wireless communication device 1 the wireless communication device 1 itself has normally received data, to the other wireless communication device 1.

The wireless interface 16 transmits and receives a wireless signal. The wireless interface 16 may be provided with one or a plurality of antennas 18. As the antenna 18, the one shared by transmission and reception may be provided, or the one dedicated to transmission and the one dedicated to reception may each be provided.

Figure 2:
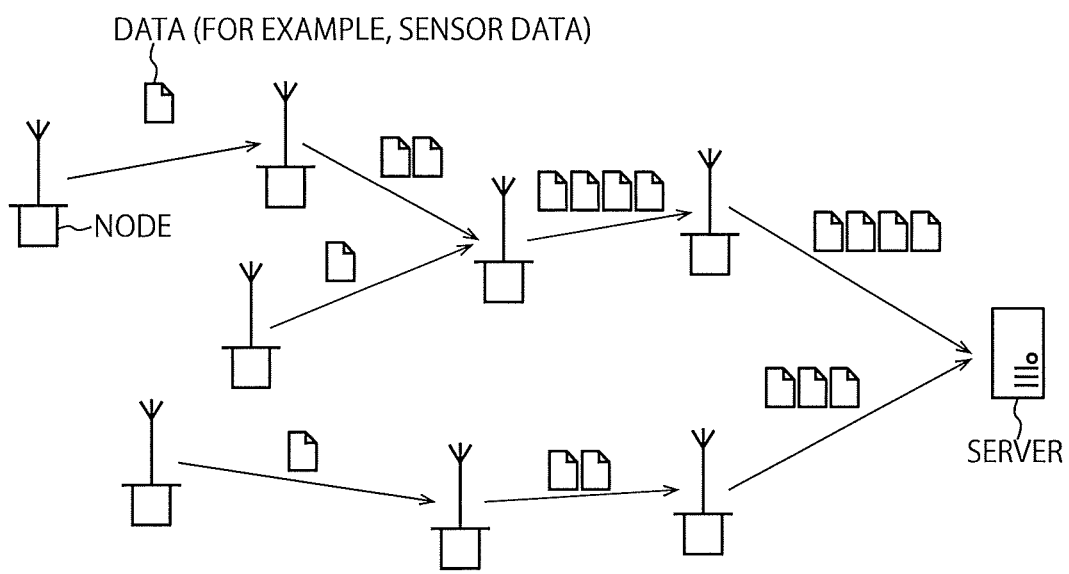
FIGS. 2 and 3 illustrate examples of a system according to embodiments.

FIG. 2 schematically illustrates one example of a system including wireless communication devices 1 according to this embodiment. A plurality of wireless communication devices 1 included in the system are each described as a node hereinafter. This embodiment is applicable to a multi-hop network, a mesh network, and the like as a network configuration. It is applicable to a sensor network which notifies sensing data to a server at predetermined time intervals, but without being limited to this, may be applied to other network configurations.

In a case of such a multi-hop network as illustrated in the diagram, a server and nodes close to the server are each set as an upper, and nodes far from the server are each set as a lower. Data from a lower node is transmitted to an upper node, to which the node is connected, and in the upper node to which the data has been transmitted, data in all lower nodes connected thereto and data in the upper node are combined to be set as new data, which is transmitted to a further upper node.

This data at least includes destination information indicating the objective node to be transmitted to, and a bit storing an ACK of each of the nodes, other than data in a sensor or the like from each of the nodes. For example, when a bit corresponding to a certain node is "1", a state where an ACK of the node can be already acquired is indicated, and when it is "0" (zero), a state where an ACK cannot be acquired yet is indicated.

Figure 3:
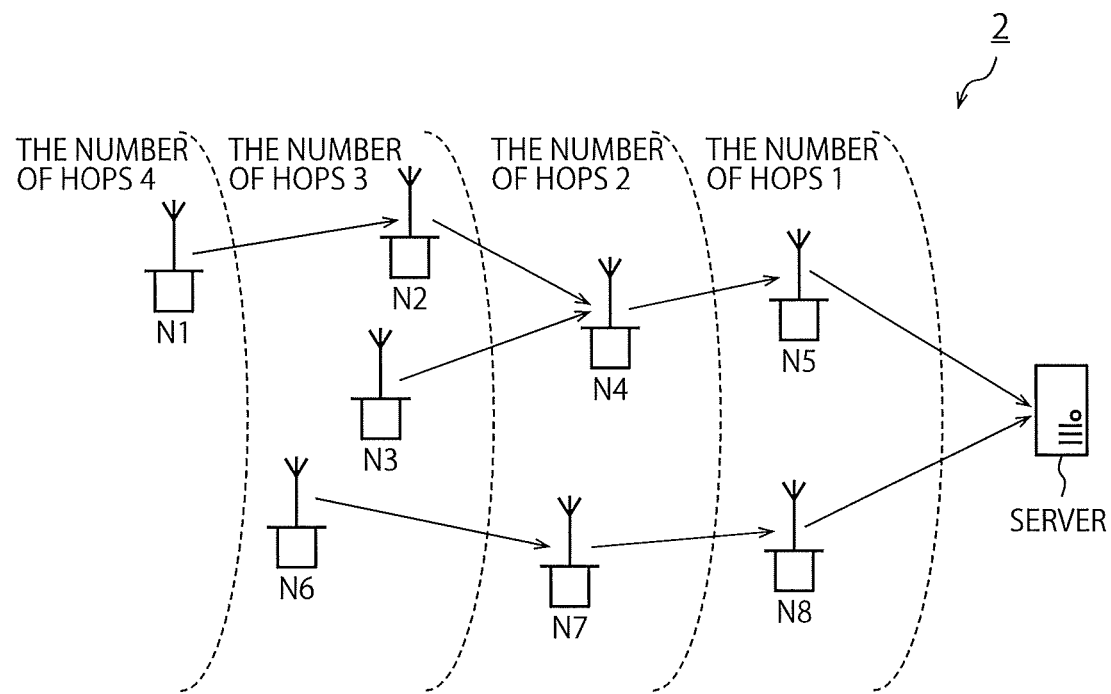

FIG. 3 is a diagram schematically illustrating one example of communication paths in a system including the wireless communication devices 1 according to this embodiment. Eight wireless communication devices 1 as a node N1 to a node N8 and a server are included. The node N1 performs communication while setting the node N2 as an upper node. The node N2 performs communication while setting the node N1 as a lower node and while setting the node N4 as an upper node. The node N3 performs communication while setting the node N4 as an upper node. The node N4 performs communication while setting the nodes N2 and N3 as lower nodes and while setting the node N5 as an upper node. The node N5 performs communication while setting the node N4 as a lower node and while setting a server 2 as an upper node. The node N6 performs communication while setting the node N7 as an upper node. The node N7 performs communication while setting the node N6 as a lower node and while setting the node N8 as an upper node. The node N8 performs communication while setting the node N7 as a lower node and while setting the server 2 as an upper.

The number of times of communication on the path until an arrival at a node from the server 2 or until an arrival at the server 2 from a node is set to be the number of hops. The nodes N5 and N8 are each a node in which the number of hops is 1, the nodes N4 and N7 are each a node in which the number of hops is 2, the nodes N2, N3, and N6 are each a node in which the number of hops is 3, and the node N1 is a node in which the number of hops is 4.

Figure 4:
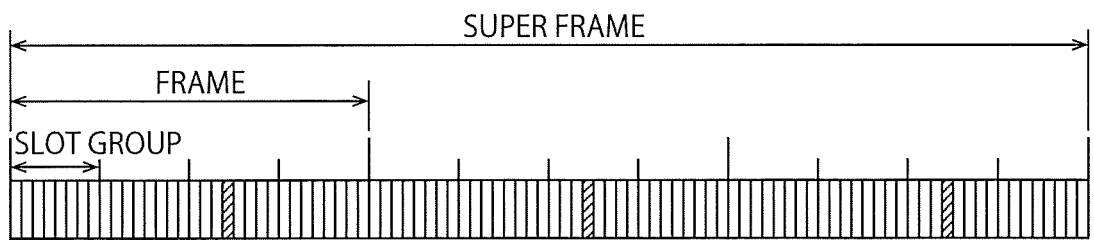
FIG. 4 illustrates one example regarding a part of a message according to one embodiment.

FIG. 4 is a diagram illustrating one example of a state of a bit sequence in which data in each of the nodes, included in messages to be transmitted and received, is stored. In FIG. 4, for the purpose of an explanation, a case where the number of nodes is 8 and the number of hops is 4 is illustrated, but this is not restrictive.

Regarding the messages to be transmitted and received in this embodiment, a cycle (super frame) in which data is generated is divided into a plurality of frames, and data transmitting/receiving of all the nodes and the server is performed in each of the frames. That is, the frame corresponds to a data transmission cycle. This frame includes a plurality of slot groups each including a plurality of slots, and data transmitting/receiving is performed in this slot unit. Each of the slots performs communication of data every predetermined time in the slot unit. For example, after a predetermined time from starting communication of a certain slot, the slot finishes the communication, and communication of the next slot is started. Thus, communication is performed in the slot unit in sequence every predetermined time. As described above, the cycle in which data is generated is set as the super frame, the one in which the super frame is divided in chronological order is the frame, moreover, the one in which the frame is divided in chronological order is the slot, and the slot group is a set of a plurality of slots.

Based on a remainder of the number of hops obtained by setting the number of slot groups (for example, 4) in one frame as a divisor, it is determined which slot group each of the nodes and the server uses to transmit data. The slot group at least includes slots corresponding to the number of all nodes including the server. Allocation of the slots in the slot group may be determined by an optional method such as use of a unique identifier which the nodes each have. Hereinafter, a case of a simple description as a remainder indicates a remainder obtained by setting the number of slot groups as a divisor.

For example, when the number of hops is 4, the slot group having a slot group index of 4%4=0 may be used, and when the number of hops is 1, the slot group having a slot group index of 1%4=1 may be used. Parent nodes of the node in which the number of hops is 4 use the slot group having a slot group index of 3%4=3. Here, x % y is synonymous with x mod y, and indicates a remainder of x divided by y. As one concrete example, the node in which the number of hops is 1 and in which an ID of the slot is 3 executes transmission of a message including an ACK at timing of the slots indicated by oblique lines in FIG. 4. The server may serve as a node in which the number of hops is "0" (zero).

As one example, the slot groups are allocated in decreasing order of the number of hops in the nodes. Then, a relay node also combines and transmits data in the child nodes together with its own data in its own transmission slots, thereby making it possible to transmit the data from the terminal node to the server smoothly in good order. The number of hops is dynamically changed depending on a scale of a network. For this reason, a required slot group sometimes falls short, but as described above, acquiring a remainder of the number of hops allows allocation to a slot group based on the remainder. In the slots in the slot group, by allocating a unique slot to each of the nodes including the server, a collision between the slots can be avoided also in the above case.

The data to be transmitted and received in each of the slots at least includes the data acquired by each of the nodes, or the like (for example, sensor data), the data acquired from each child node, the destination information, and the ACK bit sequence, as described above. The ACK bit sequence is a bit sequence which stores an ACK with respect to each node, for example, a bit sequence in which ACKs are combined in order of the server, the nodes N1, N2, ..., and N8. More concretely, the ACK bit sequence of the node N4 which has succeeded in data reception from the nodes N2 and N3 is the one in which bits such as "0, 0, 1, 1, 0, 0, 0, 0, 0" are stored in order.

Figure 5:
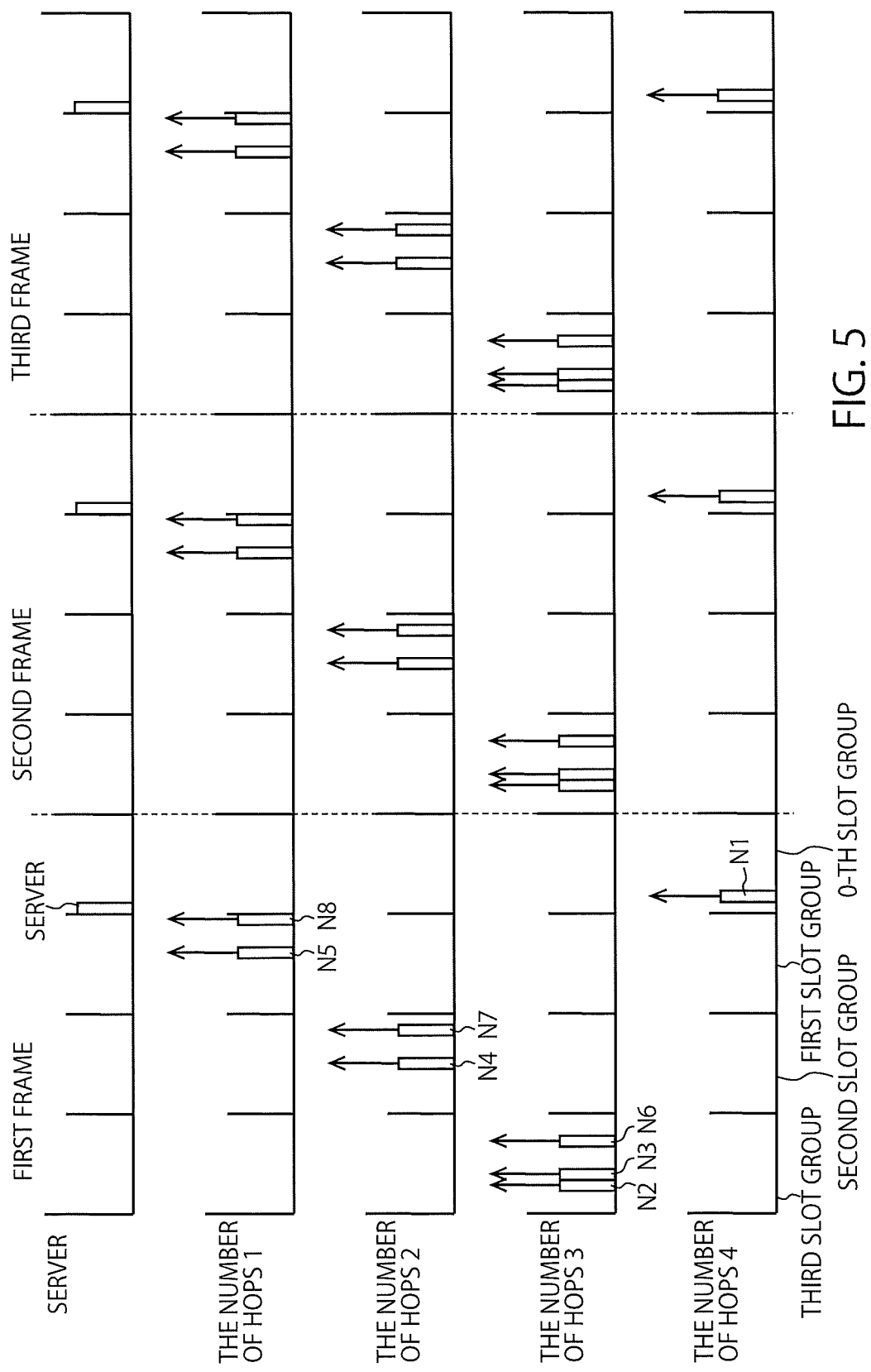
FIG. 5 illustrates one example of message transmission according to one embodiment.

FIG. 5 is a diagram illustrating one example of a state of data transmission of each of the nodes illustrated in FIG. 3. Note that each slot group includes nine slots, but as described above, without being limited to this, more slots may be included.

The data from each of the nodes is transmitted to a parent node at timing of a determined slot. Boundaries of transmission frames are indicated by dotted lines. The data is transmitted and received by the nodes allocated for each one slot group, and the nodes determined in each slot group transmit and receive the data in one frame, thereby performing transmission and reception of the data between each of the nodes and the server. The data is transmitted to the parent node according to each of arrows illustrated in the diagram at this timing of transmission and reception of each slot.

A more concrete explanation is made. As illustrated in FIG. 5, the frames are set as a first frame, a second frame, and a third frame in order. Further, the slot groups are each set as a 0-th slot group, a first slot group, a second slot group, and a third slot group.

For example, at timing of the slots of the third slot group, pieces of data in the nodes N2, N3, and N6 are transmitted to the parent nodes. Next, at timing of the slots of the second slot group, pieces of data in the nodes N4 and N7 are transmitted to the parent nodes, at timing of the slots of the first slot group subsequent thereto, pieces of data in the nodes N5 and N8 are transmitted to the parent node, and at timing of the slot of the 0-th slot group further subsequent thereto, data in the node N1 is transmitted to the parent node, respectively. Thus, by the data transmission in the frame, the data of each of the nodes is transmitted to each parent at timing of a predetermined slot in each of the slot groups. In this manner, the data transmitting/receiving is performed for each frame.

Hereinafter, for convenience, in a case of focusing attention on message transmission in a certain slot, a transmission period in a just previous slot group or a reception period of a message transmitted in the just previous slot group is defined as a first period. That is, a period in which a message is transmitted from a child node in a slot group just before a slot group to which a slot to perform the message transmission belongs, or a period in which the message from the child node is received is the first period. Similarly, a period in which a node itself transmits a message toward a parent node, or a period in which a slot group to which a slot from which the parent node receives the message which the node itself has transmitted belongs performs communication corresponds to the first period seen from the parent node.

Conversely, a period in which an ACK bit sequence is transmitted from the parent node to the child node at just previous timing, or a period in which a slot group to which a slot to receive the ACK bit sequence from the parent node belongs performs communication is defined as a first reception period. A period in which the node itself transmits the ACK bit sequence toward the child node, or a period in which the child node receives the ACK bit sequence which the node itself has transmitted corresponds to the first reception period seen from the child node. In this embodiment, the first reception period means a period in which the ACK bit sequence from the parent node in the previous frame is received.

As one example, a period in which the message from the child node at just previous timing is received is set as the first period, and a period in which the ACK bit sequence from the parent node at the just previous timing is received is set as the first reception period. Depending on implementation, as described above, the period in which the child node transmits the message may be set as the first period, and the period in which the parent node transmits the ACK bit sequence may be set as the first reception period.

Figure 6:
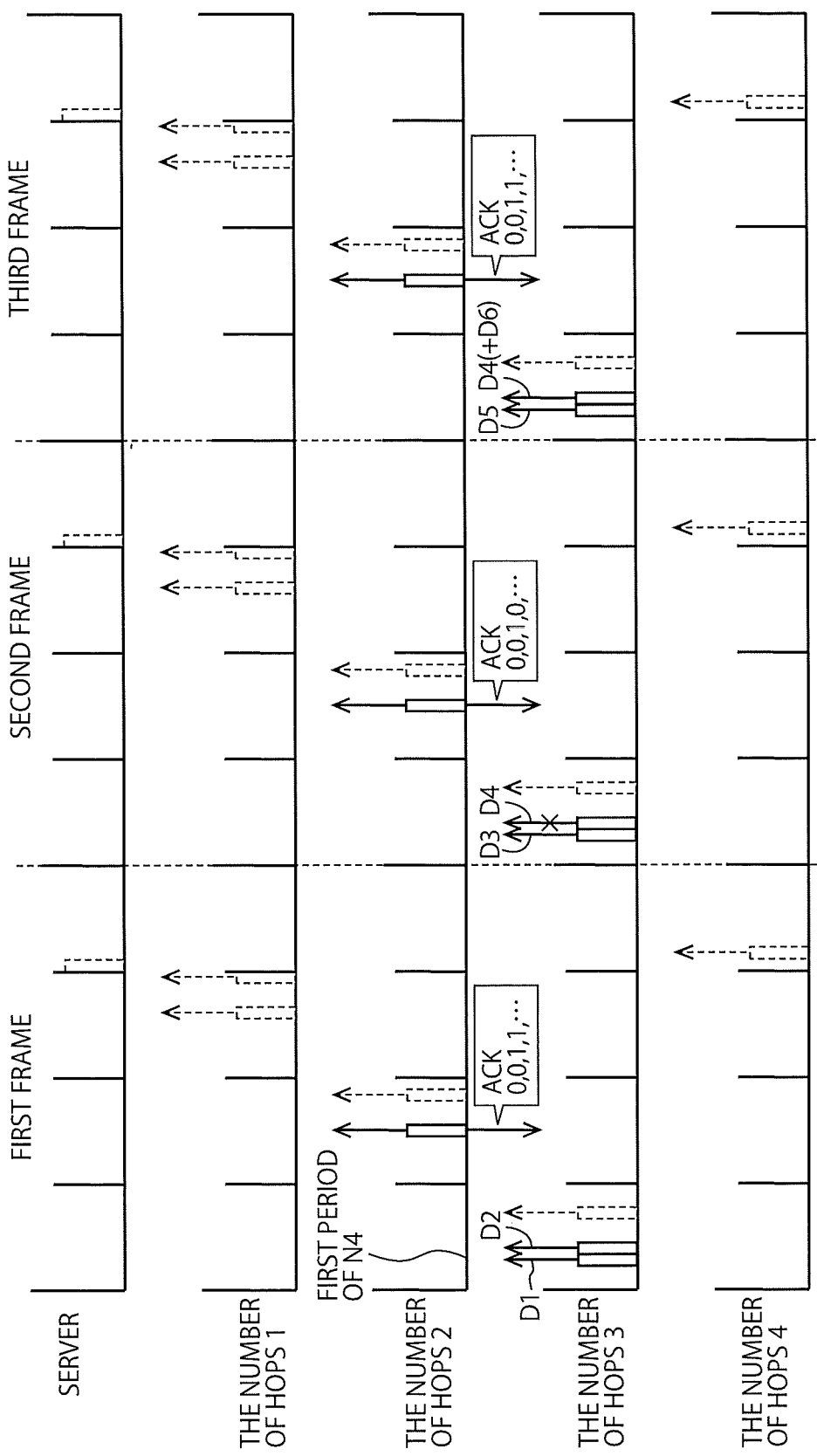
FIG. 6 illustrates one example of ACK transmission according to one embodiment.

Regarding transmission/reception of an ACK, as one example, an explanation is made by using the nodes N2 and N3 in which the node N4 in FIG. 3 is set as a parent. FIG. 6 is a diagram illustrating an example of the ACK transmission of the nodes N2 and N3 in which the node N4 is set as the parent. The node N4 being the parent of the nodes N2 and N3 executes reception processing in the first period in transmission slots corresponding to the nodes N2 and N3, and receives data. When the transmission is performed by a broadcast or a multicast, the ACK (or a NACK) is not directly returned from the receiving side to the transmitting side, differently from a unicast. Therefore, an exchange of the ACK is performed by another method.

The node N4 relays and transmits the data in the nodes N2 and N3 together with its own data in its own transmission slot. At this timing (the first reception period), the node N4 substitutes 1 in ACK bits allocated to the nodes N2 and N3 to transmit the resultant of the substitution, in order to indicate that the data from the nodes N2 and N3 has been received. The nodes N2 and N3 receive a signal transmitted by the node N4, including their own addresses in destination information, and check the ACK bits corresponding to the respective nodes N2 and N3, thereby checking whether or not the data which the nodes N2 and N3 themselves have transmitted in the first period is received by the node N4, in the first reception period. When the ACK bits are not 1, or when the data in the node N4 cannot be received, the nodes N2 and N3 retransmit the transmitted data in the next frame, thereby making it possible to correctly transmit the data.

The node N2 transmits data D1 and the node N3 transmits data D2 by using slots in the second slot group in the first period of the first frame. As destination information, the node N4 is described. The node N4 receives messages to the node itself in the first period. When the node N4 succeeds in the reception of the messages from the nodes N2 and N3, it sets the ACK bits corresponding to the respective nodes N2 and N3 in an ACK bit sequence to 1.

In response to this, the node N4 returns an ACK1 by using a slot in the first slot group in the first reception period. In the ACK1, the ACK bit sequence indicating that the data D1 and the data D2 are received to the node N4 in the first period is transmitted. In the first reception period, the nodes N2 and N3 receive this ACK bit sequence, and check that the transmission of the data D1 and D2 has succeeded.

Subsequently, the nodes N2 and N3 transmit respectively new data D3 and D4 to the node N4 in the first period of the second frame since they succeed in the transmission from the nodes themselves in the previous frame. The node N4 receives messages to the node itself. Here, the node N4 is set to succeed in the reception of the data D3 but fail in the reception of the data D4 or fail to check the transmission of the data D4. In this case, the node N4 sets a bit corresponding to the node N2 in an ACK bit sequence to 1 since it has received the data D3 from the node N2 in the first period, while the node N4 sets a bit corresponding to the node N3 to "0" (zero) since it has not received the data from the node N3.

In the first reception period, the node N4 transmits data including information of this ACK bit sequence, and the nodes N2 and N3 receive the information. The node N2 checks that it succeeds in the transmission of the data D3 since the ACK bit with respect to the node itself is 1. On the other hand, the node N3 checks that it fails in the transmission of the data D4 since the ACK bit with respect to the node itself is "0" (zero).

Subsequently, the node N2 transmits new data D5 in the first period of the third frame since it succeeds in the transmission from the node itself in the previous frame. On the other hand, the node N3 retransmits the data D4 transmitted in the previous frame since it fails in the transmission from the node itself in the previous frame. At this timing, data D6 being the next data may be transmitted together with the data D4.

Thus, checking the ACK which the parent node with respect to the node itself has transmitted makes it possible to suppress the transmission error of the data. Note that in the above, the data is set to be retransmitted based on whether the ACK is 1 or "0" (zero), and other than this, also when the ACK bit sequence to the node itself cannot be received, the message transmitted in the first period may be retransmitted. When the ACK bit sequence to the node itself cannot be received by a predetermined number of times or more, a signal having the effect that the parent node is changed may be transmitted.

Figure 7:
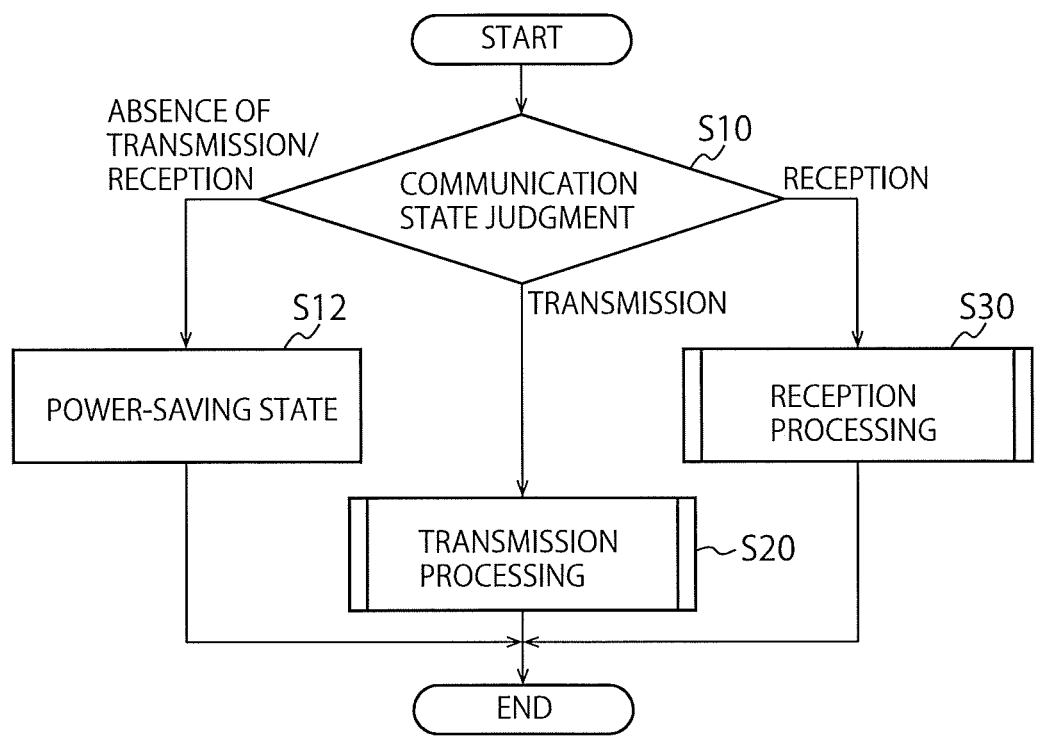
FIG. 7 is a flowchart illustrating a flow of all processing according to one embodiment.

Hereinafter, a flow of the above-described processing will be explained by using a flowchart. FIG. 7 is a flowchart illustrating an overall operation of the wireless communication device 1 according to this embodiment.

First, the communication manager 10 of the wireless communication device 1 judges a communication state (S10). When a need for transmission/reception is in an internal period in a judgment result (S10: the absence of transmission/reception), the wireless communication device 1 is made to transition to a power-saving state (S12). Thus, in a case of no need for communication, the wireless communication device 1 is made to transition to the power-saving state to suppress consumption of electric power.

When it is judged that the communication state is a transmission state, namely, a slot group to which a node belongs is in a transmission period (S10: transmission), a transition to a phase of transmission processing is made (S20). When it is judged that the communication state is a reception state, namely, the slot group to which the node belongs is in a reception period (S10: reception), a transition to a phase of reception processing is made (S30).

Figure 8:
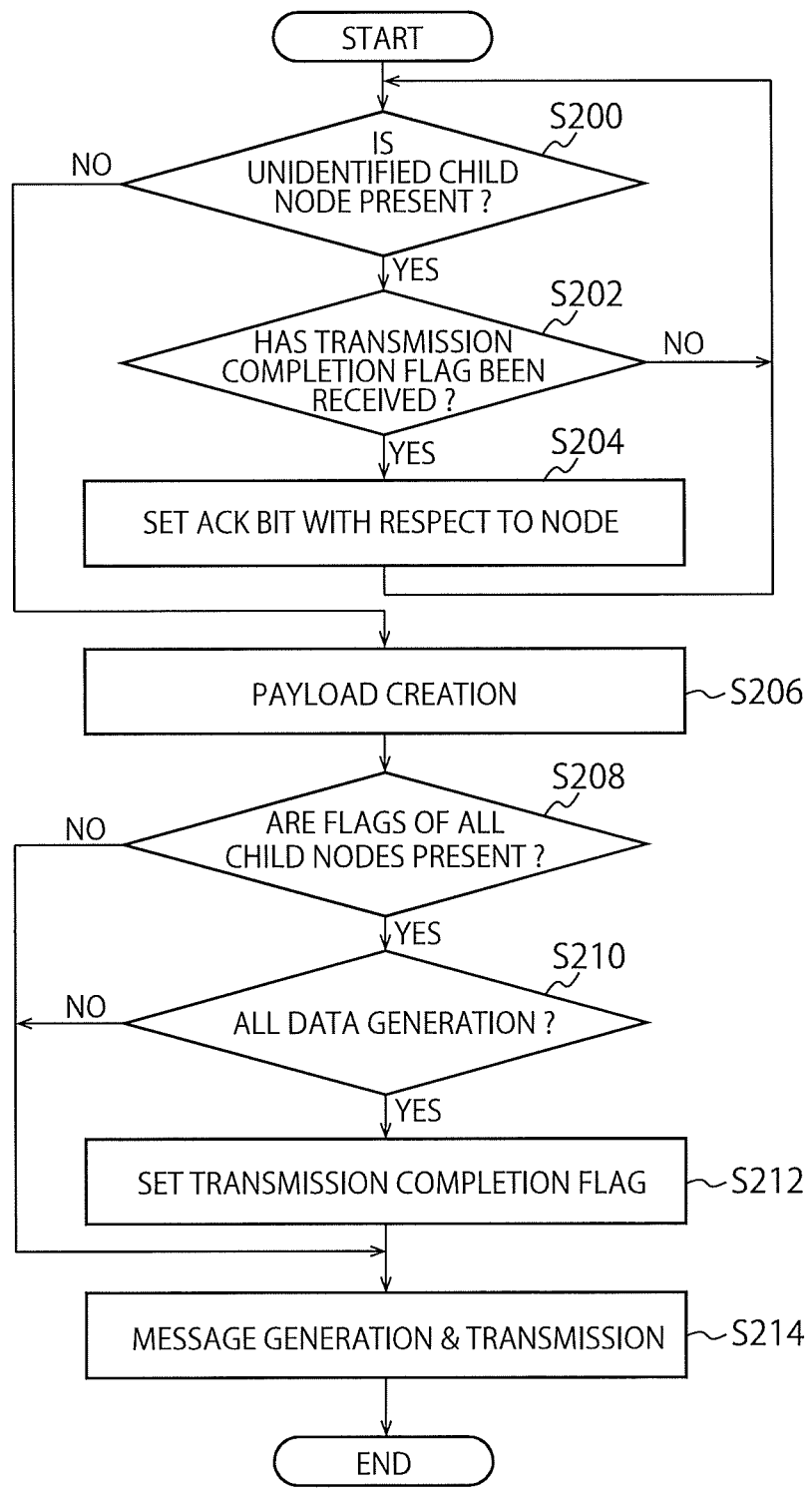
FIGS. 8 and 9 are flowcharts illustrating a flow of transmission processing according to embodiments.

FIG. 8 is a flowchart illustrating a flow of the transmission processing indicated by S20. In this embodiment, when a message is transmitted, a transmission completion flag indicating whether or not all of data of a node itself and relayed data have been transmitted is generated, and is added to the message to be transmitted from the node itself.

First, the data received from each child node is checked. At first, whether or not an unidentified child node is present is judged (S200). When the unidentified child node is present (S200: YES), processing is performed regarding the unidentified child node. The unidentified child node means a child node which has not received the transmission completion flag in the node itself, for example. Further, as another example, it is possible to check reception data from all child nodes connected to the node itself.

As this processing, whether or not the transmission completion flag of the child node on which attention is focused has been received is checked (S202). When the transmission completion flag can be checked (S202: YES), an ACK bit corresponding to the node in an ACK bit sequence is set to 1. Thus, returning an ACK signal to the reception completed child node allows the child node to judge that it need not transmit the data in a subsequent frame in the same super frame, which leads to a reduction in power consumption. A change in an ACK bit is executed by the message processor 14, for example, through control of the communication manager 10.

After setting the ACK bit, a return is made again to an operation of whether or not another unidentified child node is present. Further, when the transmission completion flag has not been received from the child node on which attention is focused (S202: NO), an operation from S200 is continued without changing the ACK bit.

After checking the transmission completed flags regarding all child nodes of the node itself (S200: NO), the message processor 14 performs creation of a payload based on the data acquired by the node itself, including the data received from the child nodes (S206).

Next, the communication manager 10 judges whether or not the transmission completion flags have been received from all the child nodes with respect to the node itself (S208). As long as the transmission from all the child nodes completes in a super frame, by finishing transmitting the data directly acquired by the node itself, it becomes possible to finish the transmission of the node itself in the super frame.

When the transmission completion flags from all the child nodes have been acquired (S208: YES), whether or not all of the data from the child nodes and the data of the node itself have been generated is subsequently judged (S210). That is, whether or not the generation of all of the data acquired by the node itself and the data relayed from the child nodes is finished is judged.

When all the data has been generated (S210: YES), a transmission completion flag of the node itself is set (S212). Subsequently, a message including the transmission completion flag of the node itself and all the data (or all data in which the transmission is not finished) is generated to be transmitted (S214).

On the other hand, when the transmission completion flags from all the child nodes have not been received (S208: NO), or all the data acquired in the node itself has not been generated (S210: NO), a message is generated by using data prepared at the timing, to be transmitted (S214).

When a slot group to which a node itself belongs is in a transmission period, a message is generated based on the processing from S200 to S214, to be transmitted.

Figure 9:
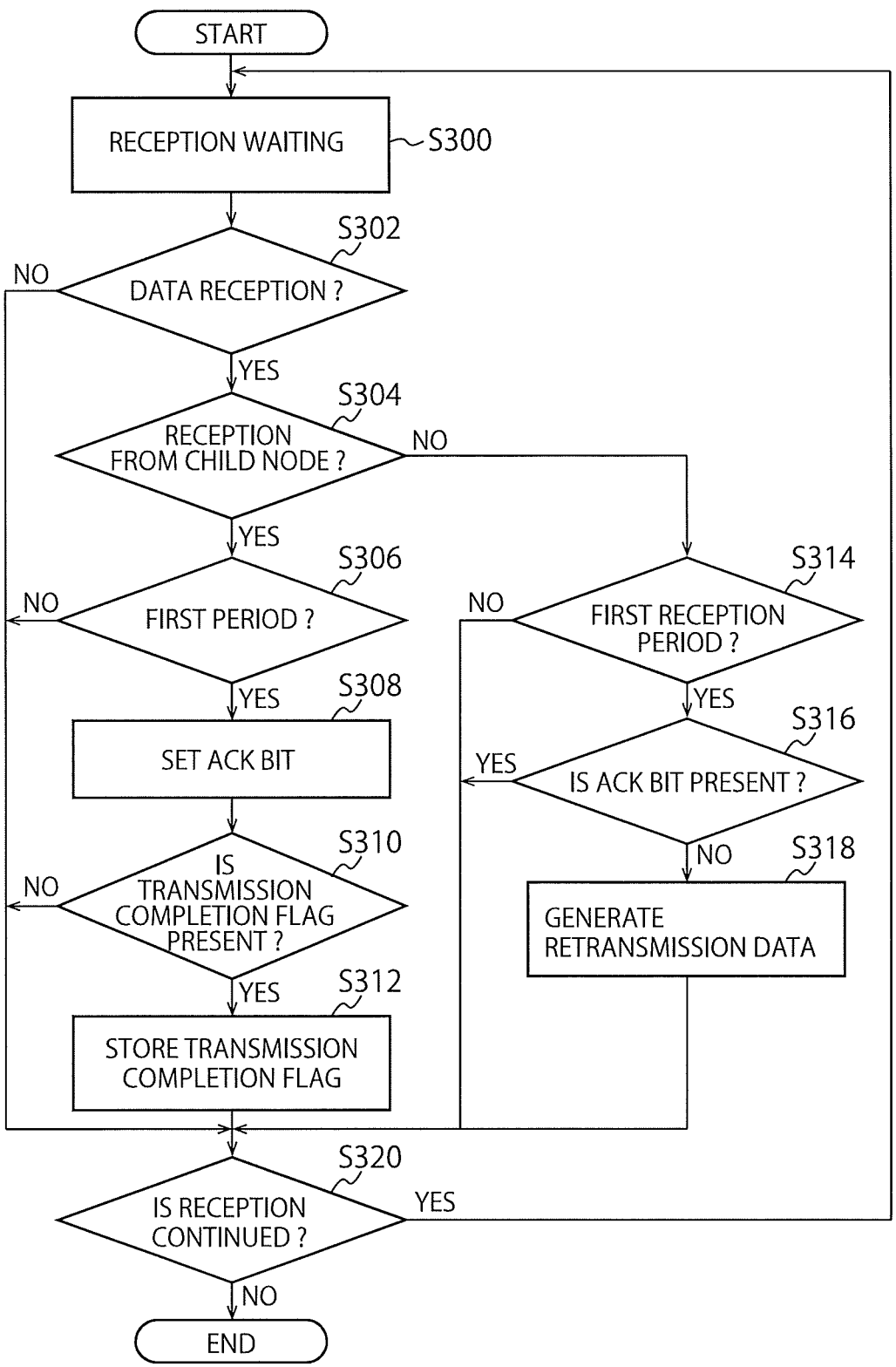

Next, a case where a slot group to which a node itself belongs is in a reception period is explained. FIG. 9 is a flowchart illustrating a flow of the reception processing indicated by S30 in FIG. 7. In this embodiment, when a message is received, control of an ACK bit with respect to the reception from a child node and processing based on an ACK bit from a parent node to the node itself are performed.

First, in a case of the reception state, the wireless communication device 1 is made to transition to a reception waiting state (S300). This reception waiting state may be continued continuously in parallel with processing to be described below until the reception from all the child nodes in the first communication period and the reception of an ACK bit sequence from the parent node in a second communication period are finished, for example.

In the waiting state, when a message in which the node itself is set as a destination has been received (S302: YES), whether or not the message has been received from the child node is checked (S304).

In a case of the reception from the child node (S304: YES), whether or not timing at which the reception has been performed is the first period is judged (S306).

In a case of the reception in the first period (S306: YES), in an ACK bit sequence in the node itself, an ACK bit with respect to the child node, which indicates that the reception from the child node of a message transmission source has succeeded, is set (S308).

Next, whether or not a transmission completion flag is present in the received message, namely, whether or not the child node of the message transmission source has transmitted all data is checked (S310). When the transmission completion flag can be checked (S310: YES), the transmission completion flag regarding the child node is stored (S312).

On the other hand, in S304, when a transmission source of the received message is not the child node (S304: NO), the transmission source is judged to be a message from the parent node, and whether or not timing at which the message has been received is the first reception period is judged (S314). Note that in this embodiment, in the reception waiting state, it is possible that to be the first period or to be the first reception period is judged before receiving data, and the transmission source is judged to be the child node or the parent node when the message has been received. As another example, after to be the first period or to be the first reception period is judged, the reception waiting state may be caused. Note that before this S314, whether or not the message is from the parent node may be explicitly judged. As a result of the judgment, in a case of no message from the parent node, for example, a transition to a step in which whether or not the reception is continued is judged is made.

When the timing at which the reception has been performed is the first reception period (S314: YES), whether or not the ACK bit with respect to the node itself is set in the ACK bit sequence in the message is checked (S316).

When the ACK bit with respect to the node itself is not set (S316: NO), a judgment is made that the parent node has not received data transmitted from the previous node itself, and data including data allowing a judgment that the transmission cannot be performed is generated as retransmission data (S318). The generated retransmission data is retransmitted to the parent node by, for example, generating and transmitting a message including a retransmission message in S214 in FIG. 8. Note that the retransmission data is not generated at this timing, and is given a flag indicating that an ACK from the parent node has been absent, and by referring to the flag in the transmission processing (S20) of the message, a message including data required to be retransmitted may be generated in message generation processing.

When no data is received (S302: NO), in a case of the reception from the child node and no first period (S306: NO), in a case where a transmission completion flag is absent from the message from the child node (S310: NO), in a case of the reception from the parent node and no first reception period (S314: NO), and in a case of the reception from the parent node and where an ACK bit of the node itself is present (S316: YES), thereafter, whether or not the reception is continued is judged (S320). Further, after storing the transmission completion flag (S312) or after generating the retransmission data (S318), a shift to the step in which whether or not the reception is continued is judged is similarly made (S320).

When a judgment is made that the reception is continued (S320: YES), the transition to the reception waiting state (S300) is made again, and when the reception is not continued (S320: NO), the processing of S30 finishes. As described above, whether or not the reception is continued may be judged based on a condition of being the first period or a condition of being the first reception period, may be further judged based on a condition of being the first period and not completing the reception from all the child nodes or a condition of being the first reception period and not completing the reception from the parent node, or may be judged by adding another condition.

In this embodiment, the data manager 12 is provided with a buffer, a memory, and the like for storing data, but in a situation in which this buffer and the like have no available capacity, there is a case where new data received from the child node cannot be added. In this case, regarding the data in which an ACK bit has been set and transmitted, the data is sometimes destroyed on the child node side, and there is a possibility that the data is destroyed in both the parent node and the child node.

In order to avoid this state, it is possible to perform an inquiry about the propriety of data addition to the data manager 12, and set an ACK bit when the data addition is possible, or finish the reception processing when the data addition is impossible, after S306 in FIG. 9. Performing processing in the above manner makes it possible to relieve the data having a risk of being destroyed by limited buffer and memory.

Further, as another example, when the buffer and the like fall short as described above, the data manager 12 may judge failure in data storage and communicate a data storage failure notification to the communication manager 10. It is also possible that the communication manager 10 does not set an ACK when it receives the data storage failure notification from the data manager 12. Thus, not setting the ACK makes it possible to notify the child node that a message transmitted from the child node has not been received normally and prompt the child node to retransmission of data to fail in the storage. For example, in FIG. 9, this processing is interposed between S306 and S308.

As described above, according to this embodiment, an ACK is imparted to a message with respect to the reception in the first period from the child node in the parent node, and the ACK from the parent node is checked in the reception in the first reception period in the child node, thereby making it possible to suppress destruction of data, or the like due to a synchronization error or the like and notify appropriate ACK bits in data transmission in both upward and downward directions. This allows reliability of communication to be improved.

Note that the step of S314 in which whether or not the reception has been performed in the first reception period is checked is not necessarily essential. It is sufficient that the child node can check whether or not data transmitted in the just previous first period has been received by the parent node and an ACK has been returned, during to the next first period. That is, it is possible to omit the step of S314 in FIG. 9, and setting the ACK with respect to the data received from the child node in the first period makes it possible to achieve an effect of the above-described embodiment.

Second Embodiment

In the above-described first embodiment, the transmission of data in an upward direction (parent node direction) and a downward direction (child node direction) is collectively performed, but this is not restrictive. This embodiment is intended to apply the above-described ACK transmitting/receiving method to a case where data is transmitted separately in the upward direction and the downward direction.

Figure 10:
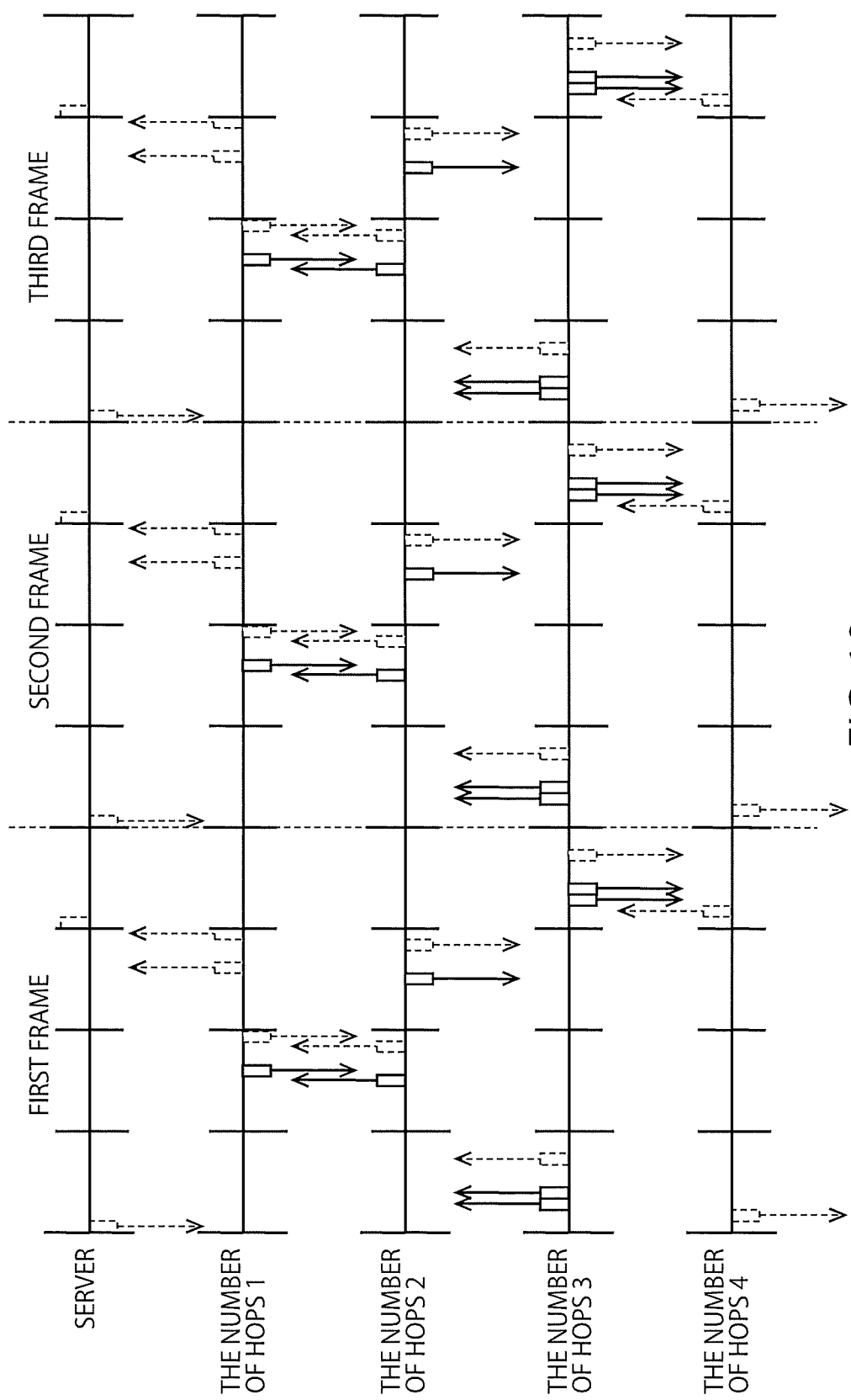
FIG. 10 illustrates one example of message transmission according to one embodiment.

FIG. 10 is a diagram schematically illustrating data transmitting/receiving according to this embodiment. In the diagram, slots and arrows going upward out of straight lines in horizontal directions are upward transmission slots and transmission processing, and slots and arrows going downward are downward transmission slots and transmission processing. Thus, the slots are each provided for the upward and downward data transmission. Similarly to FIG. 6, attention is focused on communication between nodes N2, N3, and N4, and the slots and transmission states are indicated by solid lines and communication other than them is indicated by dotted lines.

As illustrated in the diagram, upward communication is performed so as to be communicated from a node in which the number of hops (more accurately, a remainder of the number of hops divided by the number of slot groups) is large, in descending order of slot group index, similarly to the above-described embodiment. That is, in a frame, nodes N2, N3, and N6 perform transmission to the respective parent nodes in a third slot group, and subsequently, nodes of nodes N4 and N7 perform transmission to the respective parent nodes in a second slot group. Hereinafter, similarly, nodes each having the number of hops corresponding thereto perform communication upward until an index of the slot group becomes "0" (zero).

On the other hand, downward communication is performed so as to be communicated from a node in which the number of hops (the same as the above) is small, in descending order of slot group index, differently from the above-described embodiment. For example, in a frame, in an initial slot group, communication from a server and a node in which a remainder of the number of hops is "0" (zero) is performed, and in a subsequent slot group, the downward communication is performed from a node in which a remainder of the number of hops is 1.

In an example illustrated in FIG. 10, more concretely, in a slot group in which a slot group index is 3, communication from the server and a node N1 is performed, in a slot group in which an index is 2, communication from nodes N5 and N8 is performed, in a slot group in which an index is 1, communication from the nodes N4 and N7 is performed, and in a slot group in which an index is "0" (zero), communication from the nodes N2, N3, and N6 is performed. Note that in such a node for which no child node exists as the node N1, the downward communication need not be performed. Note that when the number of slot groups is an odd number, nodes which belong to a middle slot group each perform both the upward transmission and the downward transmission in parallel by using the same slot.

Similarly to the first embodiment, the node N4 receives data from the nodes N2 and N3 in the third slot group, and transmits an ACK bit sequence to the nodes N2 and N3 in the second slot group. Meanwhile, it performs reception of an ACK bit sequence from the node N5 in the second slot group.

When upward and downward ACK bit sequences are each provided, for example, the ACK bit sequence which the node N4 transmits upward is "0, 0, 1, 1, 0, 0, 0, 0, 0", and the ACK bit sequence which it transmits downward is "0, 0, 0, 0, 0, 1, 0, 0, 0". In a case of transmitting an ACK bit sequence regardless of directions, namely, the same ACK bits with respect to the upward and downward directions, such a bit sequence allowing ACK transmission with respect to either of the directions as "0, 0, 1, 1, 0, 1, 0, 0, 0" is set.

Hereinafter, for convenience, in a case of focusing attention on message transmission in a certain slot, a transmission period in a just previous slot group or a reception period of a downward message transmitted from a parent node in the just previous slot group is defined as a second period. That is, a period in which the downward message is transmitted from the parent node in a slot group just before a slot group to which a slot to perform the message transmission belongs, or a period in which the message from the parent node is received is the second period. Similarly, a period in which a node itself transmits a message toward a child node, or a period in which a slot group to which a slot from which the child node receives the downward message which the node itself has transmitted belongs performs communication corresponds to the second period seen from the parent node.

Conversely, a period in which an ACK bit sequence is transmitted from the child node of the downward message to the parent node at just previous timing, or a period in which a slot group to which a slot to receive the ACK bit sequence from the child node belongs performs communication is defined as a second reception period. A period in which the node itself transmits the ACK bit sequence toward the parent node, or a period in which the parent node receives the ACK bit sequence which the node itself has transmitted corresponds to the second reception period seen from the parent node. In this embodiment, the second reception period means a period in which the ACK bit sequence from the child node of the downward message in the previous frame is received.

Further, when attention is focused on the node N4, a period in which the data is received from the nodes N2 and N3 is the first period, and a period in which the ACK bit is received from the node N5 is the second period, but these periods are not necessarily limited to different periods. For example, as described above, when the number of slot groups is an odd number, a case of being the first period and being the second period also exists.

Figure 11:
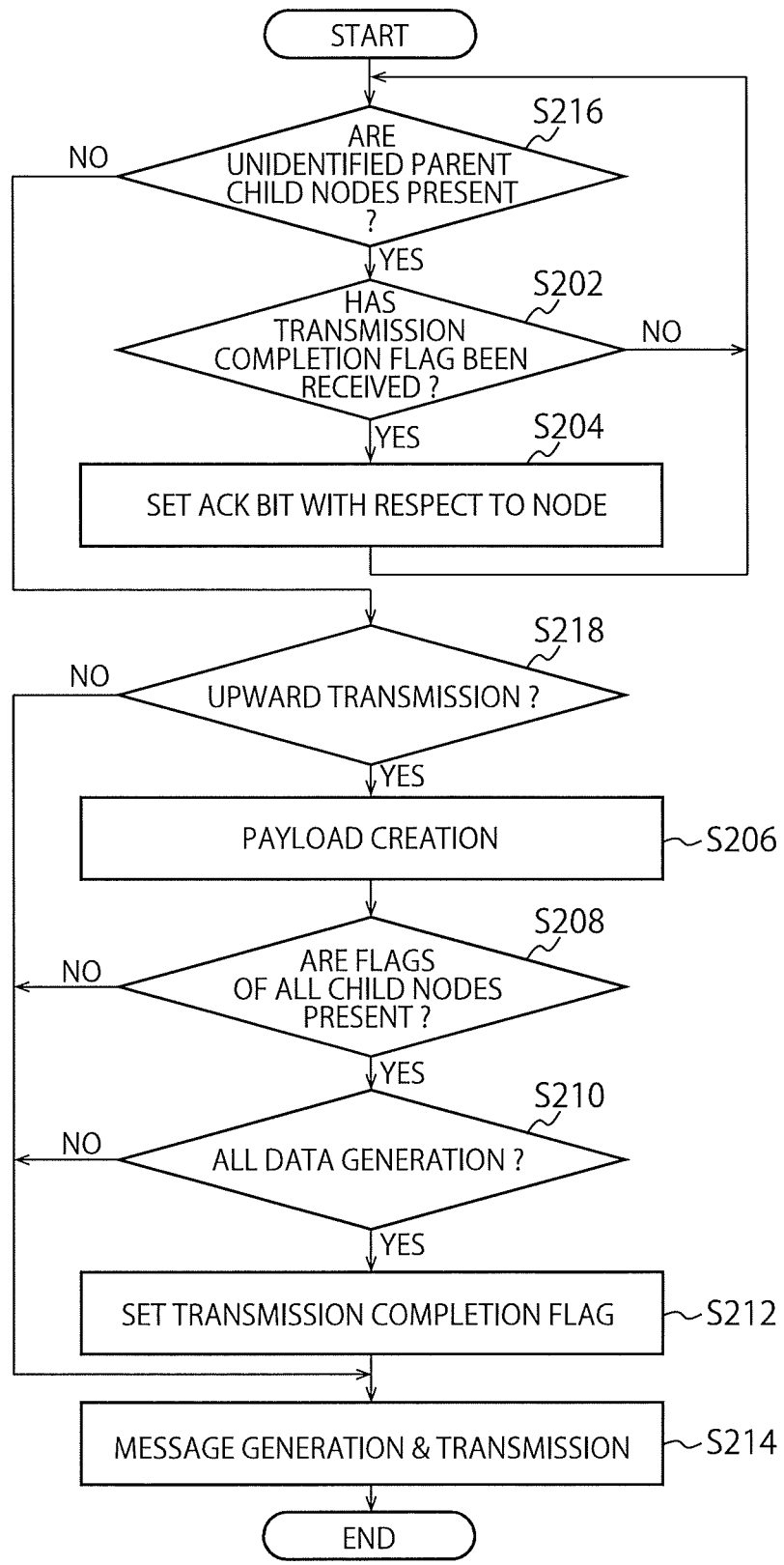
FIGS. 11 and 12 are flowcharts illustrating a flow of transmission processing according to embodiments.

FIG. 11 is a flowchart illustrating a flow of processing of the transmission processing (S20) according to this embodiment. Basically, the flowchart is similar to that in the first embodiment illustrated in FIG. 8. First, whether or not unidentified parent node and child node are present is checked (S216). This is because an ACK with respect to the parent node is included in data to be transmitted as an ACK.

After checking transmission completion flags of the parent node and the child node, the upward communication or the downward communication is judged (S218).

In a case of the upward transmission (S218: YES), similarly to the above-described first embodiment, the processing from S206 to S214 is performed. On the other hand, in a case of the downward transmission (S218: NO), without performing the processing from S206 to S212, an ACK bit sequence is generated as a message to be transmitted (S214). Thus, the ACK bit sequence is transmitted to the child node.

Performing the processing in this manner makes it possible to transmit the ACKs with respect to the upward and downward communication.

Figure 12:
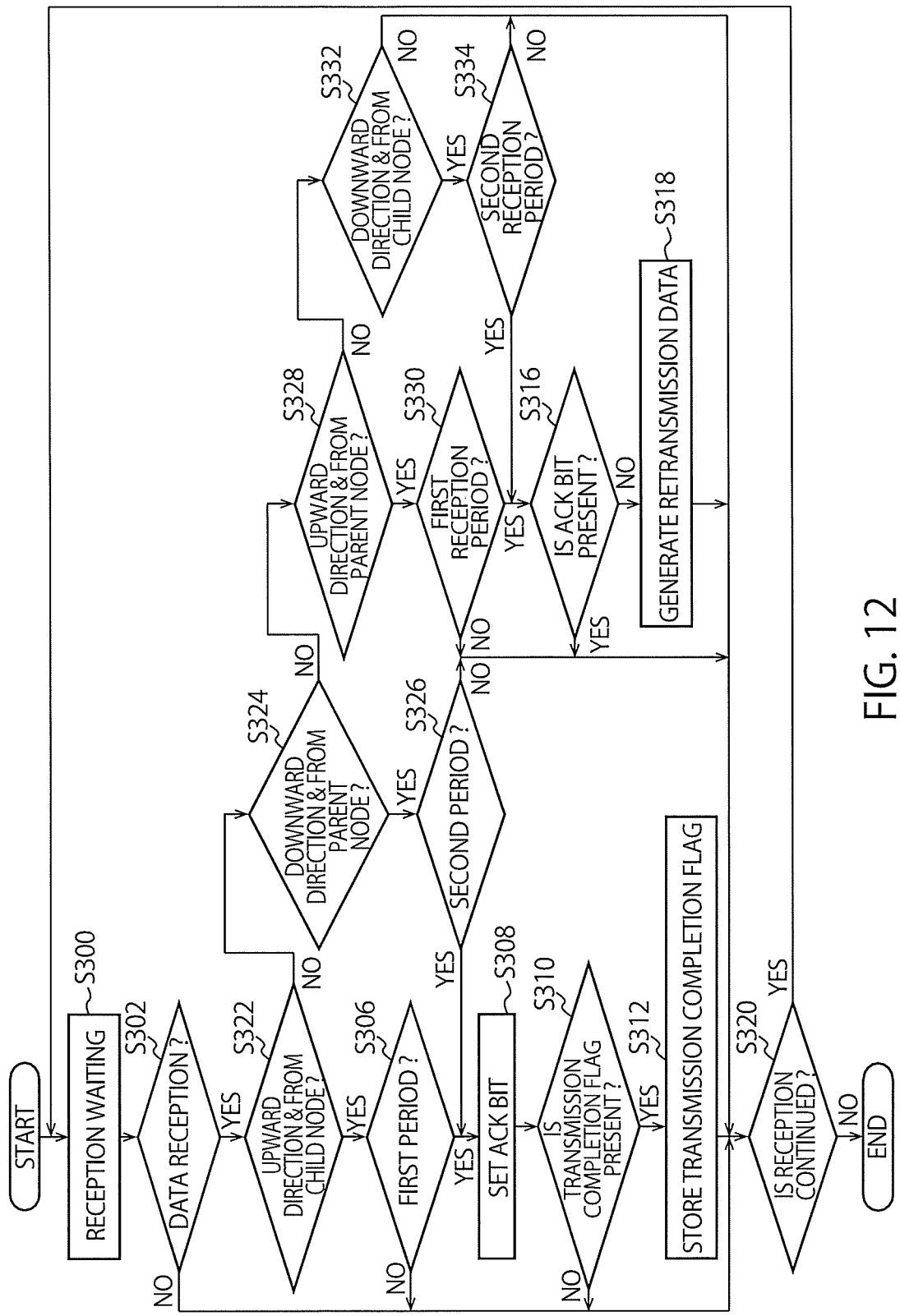

FIG. 12 is a flowchart illustrating a flow of processing of the reception processing (S30) according to this embodiment. Points different from those in the flowchart illustrated in FIG. 9 are the respective steps of S322, S324, S326, S328, S330, S332, and S334.

After receiving data (S302: YES), in this embodiment, whether or not the data is communicated for upward data transmission in addition to whether or not it has been received from the child node is judged (S322). This is because the downward transmission is performed also from the child node to thus clearly distinguish these directions. In a case of the reception in the upward direction and from the child node (S322: YES), the processing from S306 to S320 is performed.

In a case of no reception in the upward direction and from the child node (S322: NO), whether or not the data is communicated for the downward direction and has been received from the parent node is judged (S324). The reason for such a judgment is similar to the above-described reason. In a case of the reception in the downward direction and from the parent node (S324: YES), whether or not a period in which the reception has been performed is the second period is judged (S326). When timing at which the reception has been performed is the second period (S326: YES), the processing from S308 to S320 is performed. For example, when the node N4 has received a downward message from the node N5, an ACK bit corresponding to the node N5 is set to 1. When the timing at which the reception has been performed is not the second period (S326: NO), a shift to the processing of S320 is made.

In a case of no reception in the downward direction and from the parent node (S324: NO), whether or not the data is communicated for the upward direction and has been received from the parent node is judged (S328). In a case of the reception in the upward direction and from the parent node (S328: YES), whether or not a period in which the reception has been performed is the first reception period is judged (S330). When timing at which the reception has been performed is the first reception period (S330: YES), the processing subsequent to S316 is performed. When the timing at which the reception has been performed is not the first reception period (S330: NO), the shift to the processing of S320 is made.

In a case of no reception in the upward direction and from the parent node (S328: NO), whether or not the data is communicated for the downward direction and has been received from the child node is judged (S334). In a case of the reception in the downward direction and from the child node (S334: YES), whether or not the period in which the reception has been performed is the second reception period is judged (S334). When timing at which the reception has been performed is the second reception period (S334: YES), the processing subsequent to S316 is performed. When the timing at which the reception has been performed is not the second reception period (S334: NO), the shift to the processing of S320 is made.

In a case of no reception in the downward direction and from the child node (S332: NO), the shift to the processing of S320 is made. Incidentally, the order of S322, S324, S328, and S332 can also be appropriately replaced with one another.

Similarly to the above-described embodiment, the data manager 12 is provided with a buffer, a memory, and the like for storing data, but in a situation in which this buffer and the like have no available capacity, there is a case where new data received from the child node cannot be added. In this case, regarding the data in which an ACK bit has been set and transmitted, the data is sometimes destroyed on the child node side, and there is a possibility that the data is destroyed in both the parent node and the child node.

In order to avoid this state, it is possible to perform an inquiry about the propriety of data addition to the data manager 12, and set an ACK bit when the data addition is possible, or finish the reception processing when the data addition is impossible, after S306 and after S326 in FIG. 12.

Performing processing in the above manner makes it possible to relieve the data having a risk of being destroyed by limited buffer and memory. Similarly to the first embodiment, the data manager 12 may notify a data storage failure notification, and the communication manager 10 may manage an ACK.

As described above, according to this embodiment, the ACK transmitting/receiving of the above-described embodiment can also be applied to a case where messages are transmitted separately in the upward direction and the downward direction. Similarly to the above-described first embodiment, judgments of whether or not the period in which the reception has been performed is the first reception period and whether or not the period in which the reception has been performed is the second reception period are not essential configurations. That is, the steps of S330 and S334 may be omitted.

Note that without being limited to such a case, similar configurations are possible also in various kinds of message transmission. For example, it is possible to configure reception timing of an ACK and transmission timing of a message, and reception timing of the message and transmission timing of the ACK in a manner similar to flowchart processing in FIG. 7 to FIG. 9, FIG. 11, and FIG. 12 regarding transmission/reception of a message in a mesh network. For example, it is possible to, of nodes connected to each other, set the one closer to a server or the one in which a standard wireless communication device 1 is set and which is virtually closer to the wireless communication device 1 as a parent node, set the one connected on the opposite side as a child node, and set the number of wireless communication devices 1 going through between the parent node and the child node as the number of hops.

Components of the wireless communication device 1 of each of the above-described embodiments may be achieved by dedicated hardware such as an IC (Integrated Circuit) which mounts a processor and the like. For example, the wireless communication device 1 may include a reception circuit to achieve a receiver, a transmission circuit to achieve a transmitter, and a control circuit (processing circuit) to achieve a controller which controls communication management, data management, and message processing. An internal configuration of the controller may also be achieved by a dedicated circuit. Alternatively, the components may be achieved by using software (program). When the software (program) is used, the above explained embodiments can be achieved by, for example, using a general-purpose computer device as basic hardware and executing the program with a processor such as a central processing unit (CPU) mounted on the computer device. When a part of a function is configured by the software, a program which achieves a function of at least a part of a wireless communication system 2 may be stored in a storage medium such as a flexible disk or a CD-ROM, and executed by making the computer read it. The storage medium may be a fixed-type storage medium such as a hard disk device or a memory without being not limited to a detachable one such as a magnetic disk or an optical disk.

Further, the program which achieves the function of at least a part of the wireless communication system 2 may be distributed via a communication line (including wireless communication) such as the Internet. Moreover, in a state in which the program is encrypted, modulated, or packed, via a wired circuit or a wireless circuit such as the Internet, or in a state in which it is stored in the storage medium, it may be distributed.

Terms used in the embodiments are to be widely construed. For example, a term "processor" may be configured to include an analog or digital circuit, and may include a general-purpose processor, a central processing unit (CPU), a microprocessor, a digital signal processor (DSP), a controller, a microcontroller, a state machine, or the like. According to circumstances, "processor" may indicate an application specific integrated circuit, a field programmable gate array (FPGA), a programmable logic device (PLD), or the like. "Processor" may indicate a combination of processing units such as a plurality of microprocessors, a combination of the DSP and the microprocessor, or one or more microprocessors to collaborate with a DSP core.

As another example, a term "memory" may include any electronic component capable of storing electronic information. "Memory" may indicate a random access memory (RAM), a read-only memory (ROM), a programmable read-only memory (PROM), an erasable programmable read-only memory (EPROM), an electrically erasable PROM (EEPROM), a nonvolatile random access memory (NVRAM), a flash memory, or magnetic or optical data storage, and these can be read by the processor. As long as the processor reads or writes information with respect to the memory, or performs both of these, it can be said that the memory electrically communicates with the processor. The memory may be integrated into the processor, and also in this case, it can be said that the memory electrically communicates with the processor.

While certain embodiments have been described, these embodiments have been presented by way of example only, and are not intended to limit the scope of the inventions. Indeed, the novel methods and systems described herein may be embodied in a variety of other forms; furthermore, various omissions, substitutions and changes in the form of the methods and systems described herein may be made without departing from the spirit of the inventions. The accompanying claims and their equivalents are intended to cover such forms or modifications as would fall within the scope and spirit of the inventions.

For example, the ACK bit is set to 1 when the ACK is present, but may be represented in another manner without being limited to this. Further, so as to indicate explicitly that the ACK is absent, a function similar to those in the above-described embodiments may be achieved by using a NACK bit.

The invention claimed is:

1. A wireless communication device comprising:
a memory configured to store data to be transmitted and received;
a wireless interface configured to transmit and receive the data in a slot unit in a frame including slot groups, each slot group including a plurality of slots in which the frame is divided in time series; and
processing circuitry coupled to the memory and configured to:
receive the data from another wireless device, including destination information indicating node information to which the data is transmitted and acknowledgement information, via the wireless interface;
set, in a first period being a period in which the data from a child node which transmits the data upward while setting the child node itself as a destination is received, the acknowledgement information with respect to data received from the child node; process the data including the destination information and the acknowledgement information; and
transmit the data including the set acknowledgement information via the wireless interface to another wireless device,
wherein the processing circuitry determines whether the data has been received from the child node in the first period which is a previous slot group of which the transmission slot belongs, and sets the acknowledgement information to a value indicating that the data has been normally received when received from the child node in the first period and does not set the acknowledgement information to the value indicating that the data was normally received when receiving the data from the child node in the slot group to which its transmission slot belongs.

2. The wireless communication device according to claim 1, wherein the processing circuitry is configured to:
set the acknowledgement information of a parent node which transmits the data downward while setting the parent node itself as a destination, and process the data including the set acknowledgement information.

3. The wireless communication device according to claim 2, wherein the processing circuitry is configured to:
determine whether the data has been received from the parent node in a second period which is a previous slot group of which the transmission slot in the downward direction belongs, and set the acknowledgement information to the value indicating that the data has been normally received when receiving the data from the parent node in the second period and does not set the acknowledgement information to the value indicating that the data has been normally received when receiving the data from the parent node in the slot group to which the transmission slot in the downward direction belongs.

4. The wireless communication device according to claim 3, wherein
the data further includes a transmission completion flag indicating whether or not transmission of the data which the wireless communication device itself transmits is completed, and
wherein the processing circuitry is configured to: set tine transmission completion flag when reception of the transmission completion flag from a child node connected to the wireless communication device itself is completed and transmission of data which the wireless communication device itself stores in the memory is completed, in a case where upward data exists.

5. The wireless communication device according to claim 3, wherein
the data further includes a transmission completion flag indicating whether or not transmission of data which the wireless communication device itself transmits is completed, and
wherein the processing circuitry is configured to: se the transmission completion flag when reception of the transmission completion flag from each of a child node and a parent node connected to the wireless communication device itself is completed and transmission of data which the wireless communication device itself stores in the memory is completed, in a case where upward data and downward data exist.

6. The wireless communication device according to claim 1, wherein
a multi-hop network is formed with the other wireless communication device, and wherein the processing circuitry is configured to perform communication in the slot unit being timing at which communication is performed.

7. The wireless communication device according to claim 6, wherein
the slot is determined by the number of hops in a multi-hop network, and
wherein the first period is a period including the slot allocated to the number of hops of a child node.

8. The wireless communication device according to claim 3, wherein
a multi-hop network is formed with the other wireless communication device, and
wherein the processing circuitry is configured to perform communication in the slot unit as a timing at which communication is performed, and
wherein the first period is a period including the slot allocated to the number of hops of a child node and the second period is a period including the slot allocated to the number of hops of a parent node.

9. The wireless communication device according to claim 1, wherein the processing circuitry is configured to:
not set the acknowledgement information when it is impossible to store reception data. in the memory.

10. The wireless communication device according to claim 1, wherein
the wireless interface transmits the data through a broadcast or a multicast.

11. A wireless communication method comprising:
transmitting and receiving data in a slot unit in a frame including slot groups by a wireless interface, each slot group including a plurality of slots in which the frame is divided in time series;
storing data to be transmitted and received in a memory;
receiving the data from another wireless device, including destination information indicting node information to which the data is transmitted and acknowledgement information, via the wireless interface by processing circuitry;
setting, in a first period being a period in which the data from a child node which transmits the data upward while setting the child node itself as a destination is received, the acknowledgement information with respect to data received from the child node by the processing circuitry;
processing the data including the destination information and the acknowledgement information; and
transmitting the data including the set acknowledgement information via the wireless interface to another wireless device by the processing circuitry,
wherein the processing circuitry determines whether the data has been received from the child node in the first period which is a previous slot group of which the transmission slot belongs, and sets the acknowledgement information to a value indicating that the data has been normally received when received from the child node in the first period and does not set the acknowledgement information to the value indicating that the data was normally received when receiving the data from the child node in the slot group to which its transmission slot belongs.

12. A non-transitory computer readable medium storing a program which, when executed by a processor of a computer performs a method comprising:
transmitting and receiving data in a slot unit in a frame including slot groups, each slot group including a plurality of slots in which the frame is divided in time series;
storing the data to be transmitted and received;
receiving the data from another wireless device, including destination information indicating node information to which the data is transmitted and acknowledgement information, via a wireless interface by processing circuitry;
setting, in a first period being a period in which the data from a child node which transmits the data upward while setting the child node itself as a destination is received, the acknowledgement information with respect to data received from the child node;
processing the data including the destination information and the acknowledgement information; and
transmitting the data including the set acknowledgement information via the wireless interface to another wireless device,
wherein the processing circuitry determines whether the data has been received from the child node in the first period which is a previous slot group of which the transmission slot belongs, and sets the acknowledgement information to a value indicating that the data has been normally received when received from the child node in the first period and does not set the acknowledgement information to the value indicating that the data was normally received when receiving the data from the child node in the slot group to which its transmission slot belongs.

* * * * *